J. M. MAY.
ROCK DRILL.

No. 48,823. Patented July 18, 1865.

Witnesses.
S. L. Lord.
T. H. Horrick

Inventor.
John M. May

UNITED STATES PATENT OFFICE.

JOHN M. MAY, OF ROCK COUNTY, WISCONSIN.

IMPROVED ROCK-DRILL.

Specification forming part of Letters Patent No. 48,823, dated July 18, 1865

*To all whom it may concern:*

Be it known that I, JOHN M. MAY, of Rock county and State of Wisconsin, have invented a new and useful Improvement in a Rock-Drill or "Built Tool" for Drilling Rock; and I do hereby declare that the following is a full, clear, and exact description thereof, reference being had to the accompanying drawings, and to the letters of reference marked thereon.

The nature of my invention consists in employing a circular cutter or band, which I call a "thimble," that incloses near the lower end of the drill the other members of the drill, the lower edge of the thimble being slightly enlarged in diameter and brought to a sharp or cutting edge, and serves to trim the bored hole in the rock, and also saves the second operation, as now practiced, of using a reamer, independently of the drill, to make the bore smooth and fit for use; also, in making the thimble with grooves on its inner side to receive the edges of the other members of the drill; also, in providing shoulders on the outer edge of the members of the drill to rest on the upper edge of the thimble; also, in providing mortises or holes in the sides of the thimble to receive tenons that extend from the outer edge of the members of the drill to hold the thimble in place as another member of the drill, and to receive, together with the shoulders referred to, the shock of the ascending blow as the drill is operated; also, in making the inner edges of two of the members of the drill with an angle that forms for each a fulcrum, to gripe with an outward pressure the thimble as the upper ends of these members are, as levers, brought together and held by a ring, band, or taper screw; and, finally, in the general construction and arrangement of the several members of the drill in order to form a strong, compact, and efficient built tool for drilling rock.

In the accompanying drawings the same letters of reference in each figure represent the same part.

Figure 1:
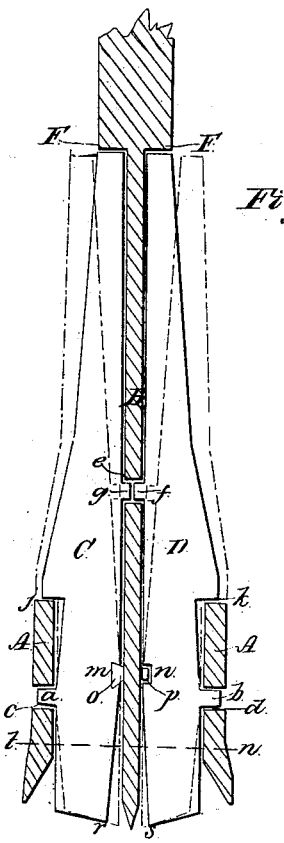
Figure 3:
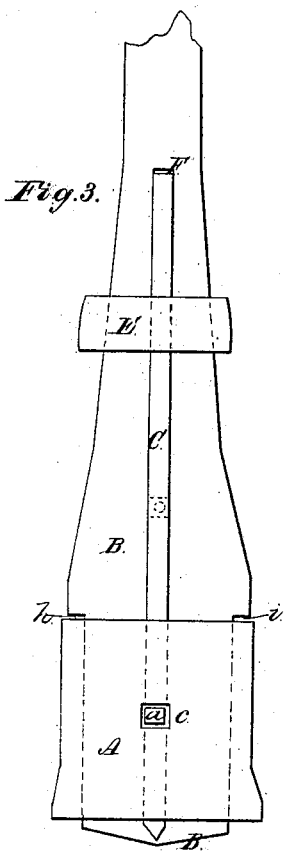
Figure 2:
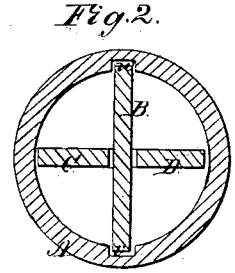
Figure 4:
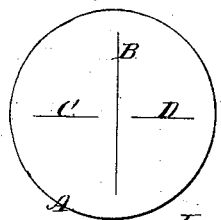

Figure 1 is a vertical section through the center of the members composing the drill and method of making and putting them together. Fig. 2 is a horizontal cross-section, (from $t$ to $u$ in Fig. 1,) showing also grooves or channels in the thimble to receive the edges of the broad member of the drill, also the relative position of the other members. Fig. 3 shows a drill with the parts of which it is composed put together. This view is at right angles with Fig. 1. Fig. 4 shows prints of the cutting-edges of the members of the drill.

A is the thimble, and has its lower edge somewhat enlarged in diameter, so that all parts thereof above the enlargement will move freely in the drilled hole, and the greatest diameter of its lower edge is made sharp by beveling it on its inside, as shown in Fig. 1, so as to trim the side or wall of the rock in drilling. This member of the drill has mortises or holes $c$ in two of its sides to receive the tenons $a$, that extend from the sides of members C and D of the drill. These members also have shoulders $j$ and $k$ to fit the upper edge of the thimble, also have tenons $g$ and $f$ to fit the mortise $e$ in the broad central member, B, of the drill, and also have recesses $m$ and $n$ (when found necessary) to receive plates or shims $o$ and $p$ at the angles in members C and D, to make more full fulcra at the angles on the inner edges of C and D, which angles and fulcra are formed by tapering the members C and D from $m$ and $n$ to $r$ and $s$. This taper, together with the taper on the outer edges of C and D, from $a$ to $j$ and from $b$ to $k$, is to allow (as the members are being put together, the members C and D being in their places inside the thimble) the upper ends of members C and D to be separated, as indicated by red dotted lines in Fig. 1, so far that the broad member B will pass between tenons $g$ and $f$ downward to its place within the thimble. Now when the upper ends of C and D are brought together under shoulders F F of the member B the tenons $g$ and $f$ enter the mortise $e$, the fulcra at $m$ and $n$ press the lower parts of the members C and D outward against the thimble, and the whole are bound together by the ring or band E as it is driven down the tapering form of the members B, C, and D, and the whole locked together in a firm compact built tool or rock-drill, as shown in Fig. 3, without the need of bolt, pin, or rivet. By removing the band E the parts are readily separated for sharpening, or for other purposes.

It will be observed that in Fig. 2 are the grooves $v$ and $w$ to receive the edges of the broad member B, which serves to give strength and solidity to the whole structure, the sholuders $h$ and $i$ resting on the upper edge of the thimble. Grooves $v$ and $w$, though useful, are not indispensable.

The upper part or stem of the drill (broken off in the drawings) may be attached to a rod or a rope in any suitable manner for operating the drill.

I do not confine myself to the precise form of the members of the drill as described. Any form substantially the same may be used. Also, bolts or rivets may be used instead of tenons and mortises and band E to fasten the parts together, in which case the inner edges of members C and D may be made straight. The plan described, and shown by the drawings, I deem the best, as bolts or rivets are liable to become loose and fall into the drilled hole as the work is progressing, and would be difficult to remove, or might wholly arrest the work of drilling.

In a patent issued on the 11th day of September, A. D. 1860, an expansive drill composed of these members and held together by a band driven onto the tapering forms of the members is described, and I do not claim, broadly, a built tool for drilling rock; but What I do claim as my invention, and desire to secure by Letters Patent, is—

1. Apertures or mortises $c$ and $d$ in thimble A, or their equivalent, to receive tenons $a$ and $v$, or their equivalent, extending from members C and D, when used to connect thimble A and members C and D of a drill, substantially as and for the purposes described.

2. Aperture or mortise $e$ in member B to receive tenons $g$ and $f$, or their equivalent, extending from members C and D of a drill, when used to connect members B, C, and D, substantially as and for the purposes described.

3. An angle and bearing at $m$ and at $n$ in members C and D, either with or without pieces $o$ and $p$, to give suitable outward pressure against the inside of thimble A to make, when the several parts are put together, a firm compact built tool, substantially as described.

4. Combining members B, C, and D with thimble A, substantially as and for the purposes described.

5. A general arrangement of members B, C, and D, thimble A, and band E, when the whole are constructed and operated substantially as and for the purposes described.

JOHN M. MAY.

Witnesses:
S. A. HUDSON,
T. H. HORNICK.